United States Patent [19]

Kimata et al.

[11] 4,270,257

[45] Jun. 2, 1981

[54] METHOD FOR MANUFACTURING A FUEL INJECTION VALVE

[75] Inventors: Kei Kimata, Aichi; Shoichi Fukunaga, Iwata, both of Japan

[73] Assignee: NTN Toyo Bearing Co. Ltd., Osaka, Japan

[21] Appl. No.: 840,297

[22] Filed: Oct. 7, 1977

Related U.S. Application Data

[63] Continuation of Ser. No. 678,762, Apr. 22, 1976, abandoned.

[30] Foreign Application Priority Data

Apr. 26, 1975 [JP] Japan .................................. 50/50923
Apr. 28, 1975 [JP] Japan .................................. 50/51831

[51] Int. Cl.³ ........................ B23P 15/00; B23P 13/00

[52] U.S. Cl. ................................ 29/157.1 R; 29/557; 29/156.7 R; 239/453

[58] Field of Search ................... 29/156.7 R, 156.7 B, 29/157.1 R, 157.1 A, 557, 149.5 B; 239/453; 228/161, 162, 160, 159; 51/103 C

[56] References Cited

U.S. PATENT DOCUMENTS

| | | | |
|---|---|---|---|
| 1,791,442 | 2/1931 | Caster | 51/103 C |
| 1,798,738 | 3/1931 | Hoern | 29/156.7 B |
| 1,826,549 | 10/1931 | Jardine | 29/156.7 R |
| 1,991,724 | 2/1935 | Binns et al. | 51/103 C |
| 2,555,803 | 6/1951 | Mashinter et al. | 239/453 |
| 3,008,653 | 11/1961 | Morris et al. | 239/453 |
| 3,488,841 | 1/1970 | Stern | 29/156.7 R |
| 3,510,112 | 5/1970 | Winquist et al. | 239/453 |
| 3,542,293 | 11/1970 | Bishop et al. | 239/453 |
| 3,613,998 | 10/1971 | Krause | 239/453 |
| 3,644,985 | 2/1972 | Koltgen | 228/162 |
| 3,715,098 | 2/1973 | Baumann | 29/157.1 R |
| 3,965,554 | 6/1976 | Amos | 29/149.5 B |

FOREIGN PATENT DOCUMENTS

| | | | |
|---|---|---|---|
| 218593 | 6/1909 | Fed. Rep. of Germany | 239/453 |
| 891487 | 9/1953 | Fed. Rep. of Germany | 29/156.7 R |
| 866597 | 8/1941 | France | 239/453 |

*Primary Examiner*—Daniel C. Crane
*Attorney, Agent, or Firm*—Hall & Houghton

[57] ABSTRACT

There is disclosed a fuel injection valve for internal combustion engines, which is used in combination with a fuel injection device for intermittent injection of fuel and which comprises a main body having a passageway extending between a fuel inlet and a fuel outlet, a valve member which cooperates with a valve seat disposed in the outlet and which is movable between a closed position and a fully open position in response to the pressure of the fuel fed into the passageway, the valve member being made up of a shaft member and a valve head, and is manufactured in such a way that a valve head made of a steel ball is welded by an instantaneous current passage welding process to one end of the shaft member and that the steel ball is cut perpendicularly to the axis on a smaller circle toward the shaft member than the equator of the steel ball so as to form an edge where the fuel jet flares.

4 Claims, 13 Drawing Figures

METHOD FOR MANUFACTURING A FUEL INJECTION VALVE

This is a continuation of application Ser. No. 678,762 filed Apr. 22, 1976 now abandoned.

BACKGROUND OF THE INVENTION (a) Field of the Invention

The present invention relates to a fuel injection valve and more particularly it relates to a fuel injection valve for internal combustion engines of the mixed gas compression and externally ignited type.

More specifically, the present invention relates to a fuel injection valve wherein the valve head is constituted by a bearing steel ball with a high degree of sphericity and the spray angle is controlled by an edge formed on the steel ball.

(b) Description of the Prior Art

Heretofore, there have been various types of fuel injection valves. Injection valves used in conbination with fuel injection devices which intermittently inject fuel must operate in such a manner that during the feeding of fuel under pressure from the fuel injection device, the valve is in its open position for atomization of fuel to form a spray and that during the stoppage of the feeding of fuel under pressure, the valve is in its closed position for prevention of the leakage of fuel. To this end, it is necessary to finish the valve head and the valve seat with particularly high precision, but it is not easy to apply such high precision process to mass-produced parts, such as automobile parts.

SUMMARY OF THE INVENTION

The present invention relates to a fuel injection valve for internal combustion engines, characterized in that it comprises a main body having a passageway extending between a fuel inlet and a fuel outlet, a valve member which cooperates with a valve seat disposed in said outlet and which is movable between a closed position and a fully open position in response to the pressure of the fuel fed into said passageway, said member being constituted by a shaft member and a valve head made of a steel ball fusion-joined to one end of said shaft member, said steel ball being ground to form an edge at a position where fuel flares.

An object of the present invention is to provide a fuel injection valve which assures accurate injection of fuel as a result of the improved precision of the processing of the valve head.

A further object of the present invention is to provide a method by which mass-production of the valve member will be carried out without deterioration of working accuracy.

DESCRIPTION OF THE PREFERRED EMBODIMENTS

Figure 1:
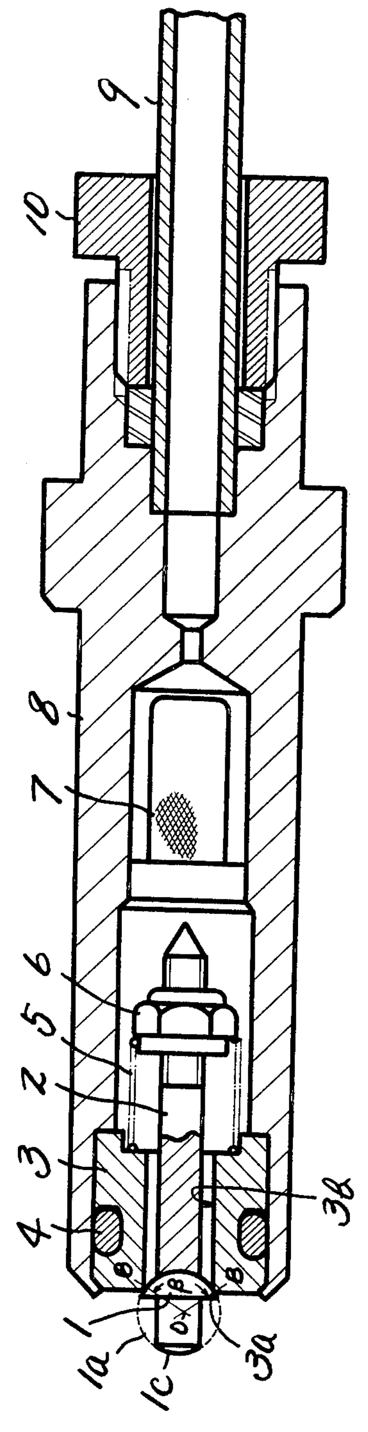
FIG. 1 is a complete sectional view showing a typical embodiment of the present invention.

Referring to FIG. 1 showing a fuel injection valve to which the present invention is applied, 1 designates a valve head formed by cutting a portion 1*a* of a steel ball; 2, a shaft member movable right and left and having said valve head 1 fixed thereto by electron beam welding, spot welding or other suitable method; 3, a valve seat whose abutting surface 3*a* associated with the valve head 1 is a tapered s surface; 4, an O-ring for sealing purposes; 5, a spring for urging the shaft member to the right to abut the valve head 1 against the valve seat 3; 6, a nut; 7, a filter; 8, a cylindrical main body; 9, a tube for connecting the injection valve to a fuel injection device for feeding fuel; and 10 designates a coupling for connecting the tube to the injection valve. In addition, the projection 1*c* on the valve head 1 plays an auxiliary role when the spring pressure is adjusted by the nut 6, and functionally it may be omitted. In that case, the valve head 1 may be provided with a recess for prevention of the rotation of the shaft. Further, the valve head 1 is in line contact with the tapered surface of the valve seat 3. Further, ∠BOB represented by $\beta$ is the vertical angle of a cone with its apex at the center O of the steel ball and including the line of contact. The relation between the valve seat 3 and the shaft member 2 is such that the shaft 2 can be inserted without contacting the inner surface 3*b* of the valve seat 3. The spring 5 interposed between the valve seat 3 and the nut 6 serves to urge the valve head 1 against the abutting surface 3*a* of the valve seat 3 for sealing when the feeding of fuel under pressure is stopped, but when fuel is fed under pressure and the pressure in the injection valve reaches a preset valve opening pressure, the valve is pushed out to the left to allow the injection of fuel. The adjustment of the valve opening pressure can be made by adjusting the amount of deflection of the spring 5, i.e., the spring pressure, by means of the nut 6.

Figure 2:
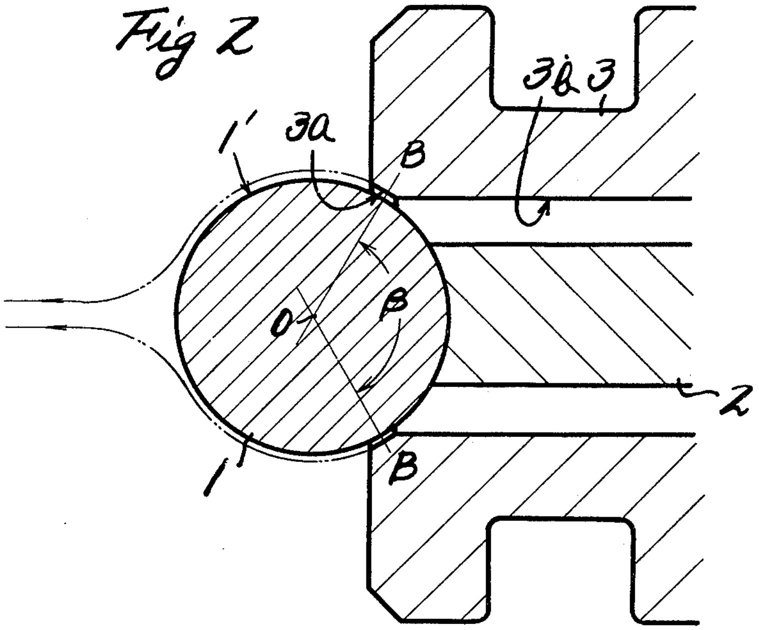
FIG. 2 is an enlarged sectional view of the principal portions for explanation of the condition of a fuel jet in the case where a steel ball to be used in the present invention is used without cutting the same.

FIG. 2 shows the condition of a fuel jet in the case where in FIG. 1 the steel ball of the head 1 is attached without being cut. In this case, the fuel flows along the surface of the steel ball 1' and does not spread in a conical curtain fashion, i.e. does not flare, which is undesirable.

In contrast, when the spherical steel ball is cut away as shown in dotted lines at 1*a* in FIG. 1 leaving a remaining spherical surface, its remaining spherical surface terminates in an edge constituting a small circle of the sphere in the plane perpendicular to the axis of the shaft member and more proximate to the shaft member than is the center of the sphere. The small circle is defined as a circle smaller than a circle on the surface of the sphere in a plane passing through the center of the sphere. Then as fuel is forced past the said remaining spherical surface and edge 1*b* it flares at a spray angle controlled by the edge formed on said remaining spherical surface.

Figure 3A:
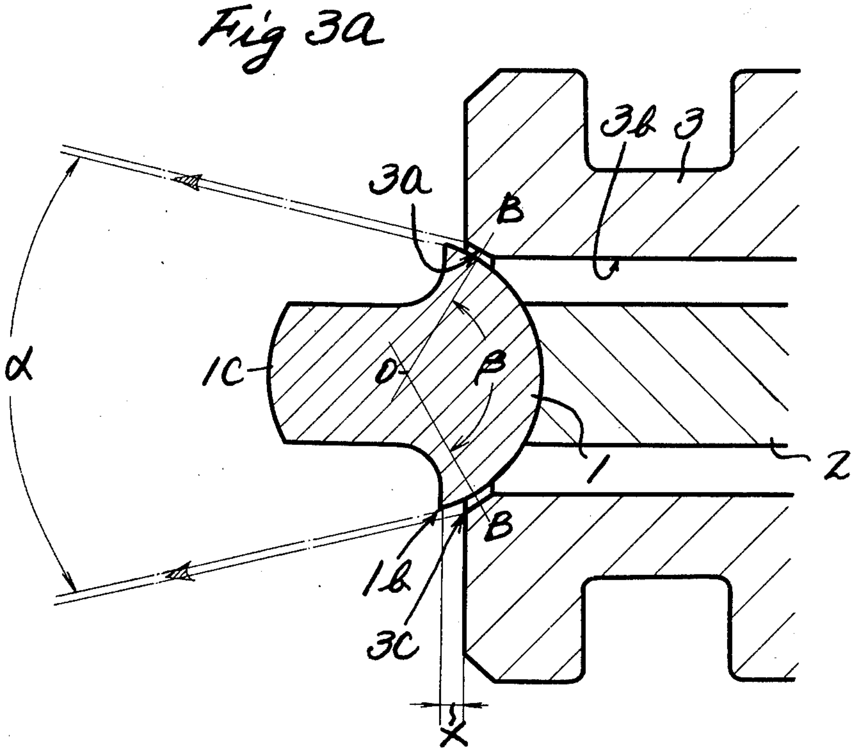
FIGS. 3*a*, 3*b*, 3*c* and 4 are enlarged sectional views of the principal portions of embodiments of FIG. 1.

FIGS. 3*a*, 3*b*, 3*c* and 4 show the principal portions of embodiments of the present invention, illustrating the relation between the valve head 1 made of a steel ball cut on a small circle of the sphere perpendicular to its axis and the tapered surface 3*a* of the valve seat 3 abutting thereagainst. In the case of FIG. 3*a*, the edge 1*b* of valve head 1 is located outside the edge 3*c* of the valve seat 3. In this case, since the fluid flies in a direction tangential to the edge 1*b* of the ball surface, the spread angle α of jet can be easily adjusted by suitably selecting the position X of the edge 1*b*.

Figure 3B:
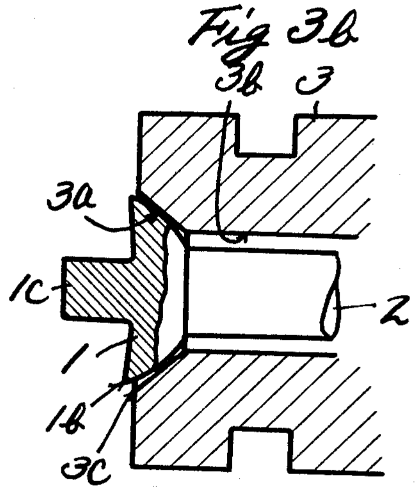
Figure 3C:
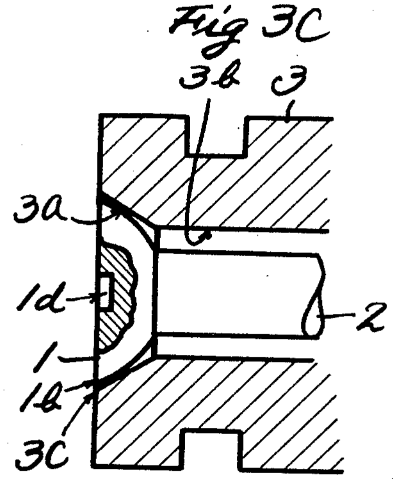
Figure 4:
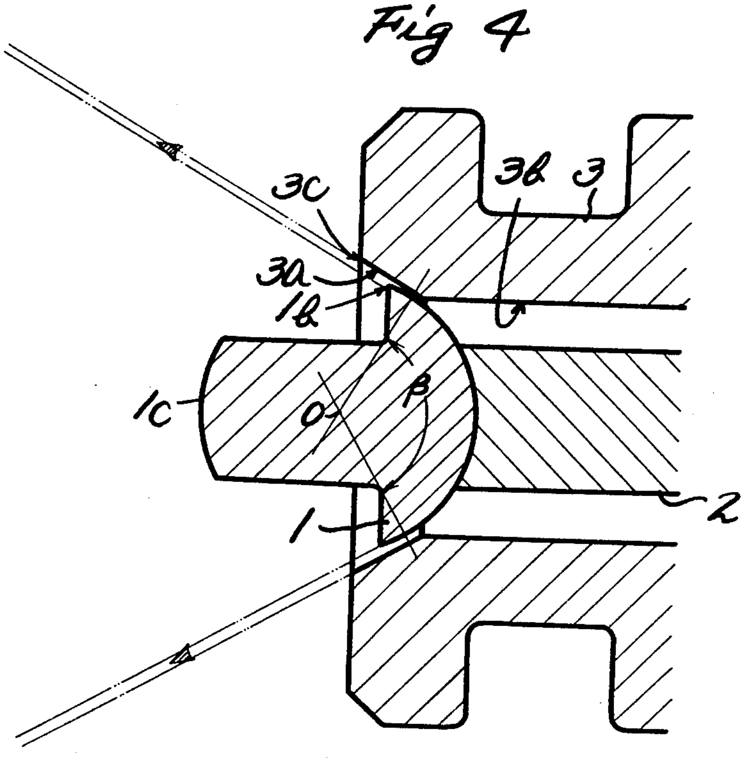

FIG. 3*b* shows a valve head 1 made of a steel ball ground at an acute angle with respect to the axis, said acute angle being inclined inwardly toward said shaft member 2 and forming a recess or hollow in its end surface remote from said shaft member 2, as shown; and FIG. 3*c* shows an example in which instead of the projection 1*c*, a recess 1*d* is provided in the bottom surface of a valve head made of a steel ball. In the case of FIG. 4, the edge 1*b* of the valve head 1 is located inside the edge 3*c* of the valve seat 3 and in this case the jet flies in the direction in which the abutting surface (tapered surface) 3*a* of the valve seat 3 is inclined.

FIG. 4 shows another embodiment of the present invention, wherein the abutting surface 3*a* of the valve seat 3 is inclined.

Figure 5:
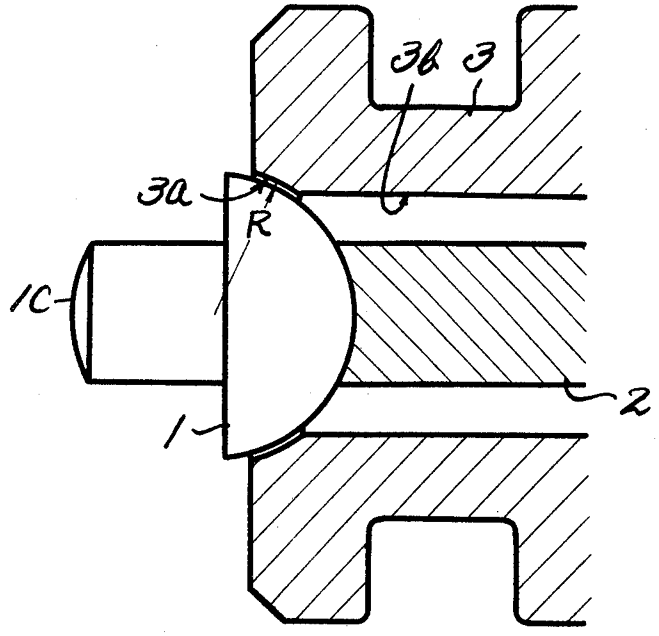
FIG. 5 is an enlarged sectional view of the principal portions, showing another embodiment of the valve seat of the injection valve according to the present invention.

FIG. 5 shows another embodiment of the present invention, wherein the abutting surface 3*a* of the valve seat 3 is finished in the form of a spherical surface having substantially the same radius as that of the valve head 1 so that the valve head 1 and the abutting surface 3*a* may be in surface contact with each other. In this case, as compared with the case where the valve head 1 is in line contact with the abutting surface 3*a* of the valve seat 3, the sealing is further improved. The forming of the abutting surface 3*a* can be easily carried out by the cold forming process.

Figure 6:
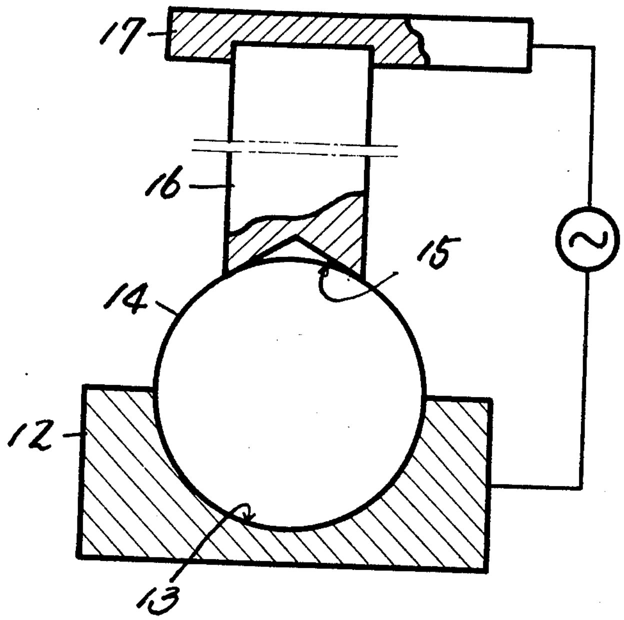
FIG. 6 is a view for explanation of a method of fusion-joining a steel ball forming a valve head to the shaft member.
Figure 7:
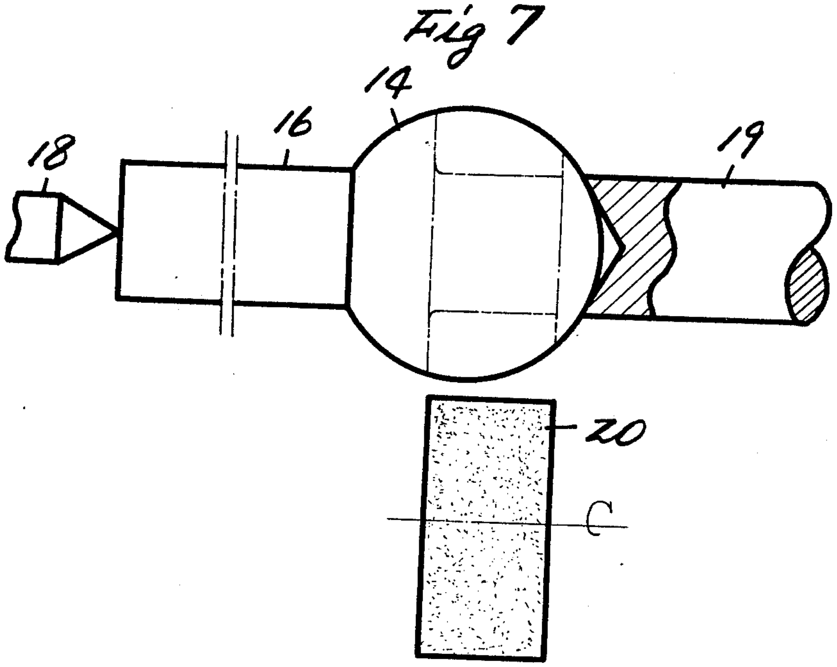
FIG. 7 is a view for explanation of a method of grinding a valve head on a welded blank.

FIGS. 6 and 7 show a preferred example of fixing a steel ball to the front end of the shaft member and grinding the steel ball so as to make it suitable for use as a valve head. This process comprises, first, as shown in FIG. 6, fitting a steel ball in a semispherical recess 13 in a first jig 12, putting a shaft 16 having a conical recess 15 formed in one end thereof on the exposed portion of said steel ball 14, applying a second jig 17 to the other end of said shaft member 16, applying a pressure P to the shaft member 16 and steel ball 14 by means of the first and second jigs 12, 17, instantaneously passing a large amount of current in this condition to heat to a high temperature the abutting narrow annular region of high electric resistance between the steel ball 14 and the shaft member 16, thereby securely welding them together at said abutting region. The weld strength can be set to various predetermined values by changing the various conditions including the applied pressure, the applied voltage and current, and the time of pass of current. The welded blank thus obtained is then supported at its opposite ends between rotatable centers 18 and 19, as shown in FIG. 7, and while rotating said welded blank, part of the steel ball 14 is ground and cut by a tool 20 to provide a desired valve head made of a steel ball. If the above described method is employed for producing valve heads according to the present invention, steel balls which are now in use for production of ball bearings and the like can be used. Steel balls used for ball bearings and the like are extremely high in accuracy and meet all the conditions concerning sphericity, surface roughness and cost. Moreover, such steel balls are readily available. If, therefore, steel balls are used for production of valve heads according to the present invention, the sphericity requirement for the spherical surface portion can be fully met. In addition, it is also possible to use laser beams for welding of steel balls and shaft members.

As has been described so far, according to the present invention, the valve head of a fuel injection valve for internal combustion engines is in the form of a steel ball fixed to one end of a shaft member movable between a valve opening position and a valve closing position, said steel ball being partly cut away to form an edge substantially perpendicular to the axis of the shaft member at a position where a fuel jet flares. Therefore, the satisfactory sealing between the valve head and the valve seat which is essential to fuel injection valves can be easily obtained. If the valve head is finished by ordinary grinding, an extremely high degree of processing technique is required in order to achieve a circularity of 0.5μ. In contrast, steel balls for ball bearings, at present, are very easy to finish with a circularity of the order of 0.1μ and they can be mass-produced. Therefore, by using such steel balls which are commercially available to make valve heads, satisfactory sealing is obtained. Further, if the same degree of sealing as in the conventional case is to be obtained, the circularity of any section of the conical surface of the valve seat is allowed to be somewhat inferior, which means that the processing is easier.

Fuel scatters in a flare as a result of the partial cutting of the steel ball, and since the spray angle depends on the position where the steel ball is cut, the adjustment of the spray angle is very easy. Further, steel balls can be mass-produced and their mutual differences are small, and steel balls with superior circularity are readily commercially available. Further, the operation of welding steel balls to end surfaces of shaft members is very easy, so that the productivity and efficiency are high and there are great merits from the standpoint of cost.

While there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. A method for manufacturing a valve member for use in a fuel injection valve present in an internal combustion engine wherein the valve member is axially movable to and from a cooperating seat member to permit the fuel injection valve to fully open and close, the method comprising the steps of butt welding a steel ball bearing to one end of a shaft member having the opposite end thereof threaded, mounting the welded ball and shaft member at its opposite ends in a revolvable state in support means therefor and thereafter grinding the steel ball as said welded ball and shaft are rotated about an axis extending through said shaft to cut away a portion of the steel ball remote from the shaft member leaving a remaining spherical surface whereby said grinding forms a rod-like extension extending from the spherical ball and so that its remaining spherical surface terminates as a circular edge constituting a small circle that is smaller than a circle on the surface of the sphere in a plane passing through the center of the sphere with the small circle lying in a plane perpendicular to the axis of the shaft member and more proximate to the shaft member than is the center of the sphere, whereby fuel injected past said remaining spherical surface will flare as it leaves said edge.

2. A method as set forth in claim 1, wherein the grinding and cutting away of the steel ball results in the formation of a substantially cylindrical projection at its end surface remote from the shaft member and coaxial therewith.

3. A method as set forth in claim 1, wherein the steel ball is cut away at right angles to the axis of the shaft member to form said edge.

4. A method as set forth in claim 1, wherein the steel ball is cut away at an acute angle with respect to the axis of the shaft member to form said edge, said acute angle being directed inwardly and toward said shaft member and thereby forming a recess or hollow in the cut end surface remote from the shaft member.

* * * * *